(12) United States Patent
Aguilar (10) Patent No.: US 9,449,475 B2
(45) Date of Patent: Sep. 20, 2016

(54) EMERGENCY LOCATION DEVICE

(71) Applicant: Peter Aguilar, Lancaster, CA (US)

(72) Inventor: Peter Aguilar, Lancaster, CA (US)

( * ) Notice: Subject to any disclaimer, the term of this patent is extended or adjusted under 35 U.S.C. 154(b) by 230 days.

(21) Appl. No.: 14/286,249

(22) Filed: May 23, 2014

(65) Prior Publication Data
US 2015/0161857 A1    Jun. 11, 2015

Related U.S. Application Data

(60) Provisional application No. 61/963,627, filed on Dec. 9, 2013.

(51) Int. Cl.
*G08B 5/00* (2006.01)
*B64B 1/50* (2006.01)

(52) U.S. Cl.
CPC ............... *G08B 5/002* (2013.01); *B64B 1/50* (2013.01)

(58) Field of Classification Search
CPC ............ B64B 1/00; B64B 1/40; B64B 1/50; G08B 5/00; G08B 5/002; G08B 5/02
USPC ........ 116/209, 210, DIG. 8, DIG. 9; 244/33; 441/23, 24, 30, 31
See application file for complete search history.

(56) References Cited

U.S. PATENT DOCUMENTS

| | | | | |
|---|---|---|---|---|
| 3,310,024 A | * | 3/1967 | McConnell | G08B 5/002 116/210 |
| 3,381,655 A | * | 5/1968 | Rozzelle | B64B 1/62 116/210 |
| 3,721,983 A | * | 3/1973 | Sherer | H01Q 1/082 116/210 |
| 3,735,723 A | * | 5/1973 | Lutz | G08B 5/002 116/210 |
| 4,815,677 A | * | 3/1989 | Rushing | G08B 5/002 116/210 |
| 4,944,242 A | * | 7/1990 | Russell | B64B 1/50 116/210 |
| 5,429,244 A | * | 7/1995 | McCreary | B64B 1/50 116/210 |
| 6,359,568 B1 | * | 3/2002 | Johnson | B63C 9/21 116/210 |
| 6,477,979 B1 | * | 11/2002 | Sanchez | B64B 1/50 116/210 |
| 7,478,779 B2 | * | 1/2009 | Nguyen | F21V 3/023 244/24 |
| 2012/0214371 A1 | * | 8/2012 | Pisor | B63C 11/26 441/30 |
| 2012/0286952 A1 | * | 11/2012 | Cienfuegos | G08B 5/002 340/539.13 |

FOREIGN PATENT DOCUMENTS

| | | | | |
|---|---|---|---|---|
| JP | 7037184 Y2 | * | 8/1995 | ............... B64B 1/50 |
| JP | 09190585 A | * | 7/1997 | ............... G08B 5/00 |
| WO | WO 9115266 A1 | * | 10/1991 | ............ A62B 33/00 |

* cited by examiner

*Primary Examiner* — Richard A. Smith (74) *Attorney, Agent, or Firm* — Cotman IP Law Group, PLC (57) ABSTRACT

An emergency location device with a deployable rescue balloon is presented. The balloon is housed in tube body in its stowed state with a frangible foil holding it in place at the proximal edge of the tube body. The device includes a ball valve attached to the opposite end of the balloon and further coupled to a charger valve. The charger valve includes a piercing needle configured to pierce a helium pressure tank thereby deploying and inflating the rescue balloon. The helium tank, the charger valve, and the ball valve are all enclosed in the lumen of the tube body. The balloon is attached to the inside of the tube body via a lanyard, which unravels when the balloon is deployed. A threaded cap coupled to the distal end of the tube body, which is also used to deploy the balloon, secures the helium pressure tank in the tube body.

17 Claims, 12 Drawing Sheets

EMERGENCY LOCATION DEVICE

CROSS-REFERENCE TO RELATED APPLICATIONS

The present application claims the benefit of U.S. Provisional Application Ser. No. 61/963,627 filed on Dec. 9, 2013, specification of which is herein incorporated by reference for completeness of disclosure.

BACKGROUND OF THE INVENTION

Field of the Invention

Embodiments of the invention relates to the field of signals and indicators, and more specifically, to emergency location indicators.

BRIEF SUMMARY OF THE INVENTION

One or more embodiments of the invention provide a field deployable emergency location device to enable rescuers to find a person or thing needed to be rescued. The emergency location device comprises tube body or housing, with a lumen therethrough. The tube body is preferably configured like a funnel at its proximal end and with a threaded inside perimeter at its distal end. The tube body further includes at least one orifice for securing a safety strip to prevent cartridge activation.

In one or more embodiments, the emergency location device further comprises rescue balloon that is configured to fit inside the funnel end of the tube body in its stowed state. The rescue balloon is packaged into the funnel end of the tube body and enclosed by a frangible foil end cap affixed to the end of the flared (funnel) end.

In one or more embodiments, emergency location device further comprises a filler ball valve coupled to the rescue balloon with its proximal end attached to the rescue balloon. The filler ball valve allows for inflation of rescue balloon and prevents deflation. An LED strobe fob (with its own built-in battery) may be attached to the filler ball valve.

In one or more embodiments, emergency location device further comprises a charger valve coupled to the distal end of filler ball valve. The charger valve is installed and mounted in the lumen of tube body between the filler ball valve and the cartridge safety strip. The cartridge safety strip separates the helium pressure cartridge from the charger valve to prevent inadvertent deployment of rescue balloon.

In one or more embodiments, a lanyard with spool secures the rescue balloon tube body.

In one or more embodiments, emergency location device further comprises helium pressure cartridge inside the lumen of the tube body. The helium pressure cartridge is mounted such that its proximal end, i.e. top of the cartridge, abuts cartridge safety strip and its distal end is towards distal end of the tube body.

In one or more embodiments, a cap is screwed into the distal end of the tube body to secure helium pressure cartridge inside the tube body. A safety clip may be installed between the tube body and the cap to prevent inadvertent plunging of the helium pressure cartridge into the charger valve.

In one or more embodiments, the cap may further include a clip for securing the emergency location device to a person or thing needing rescue.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The emergency location device in accordance with embodiments of the present invention will now be described. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention comprises a compact device that can be used to enhance the visibility of the person or thing by providing a visual aid to rescuers in any land or water type situation if they become lost, injured, or generally needed to be rescued.

A detailed description of the specific components and optional components of the emergency location device in accordance with an embodiment of the present invention will be described using the illustrations of FIGS. 1 to 12.

Figure 1:
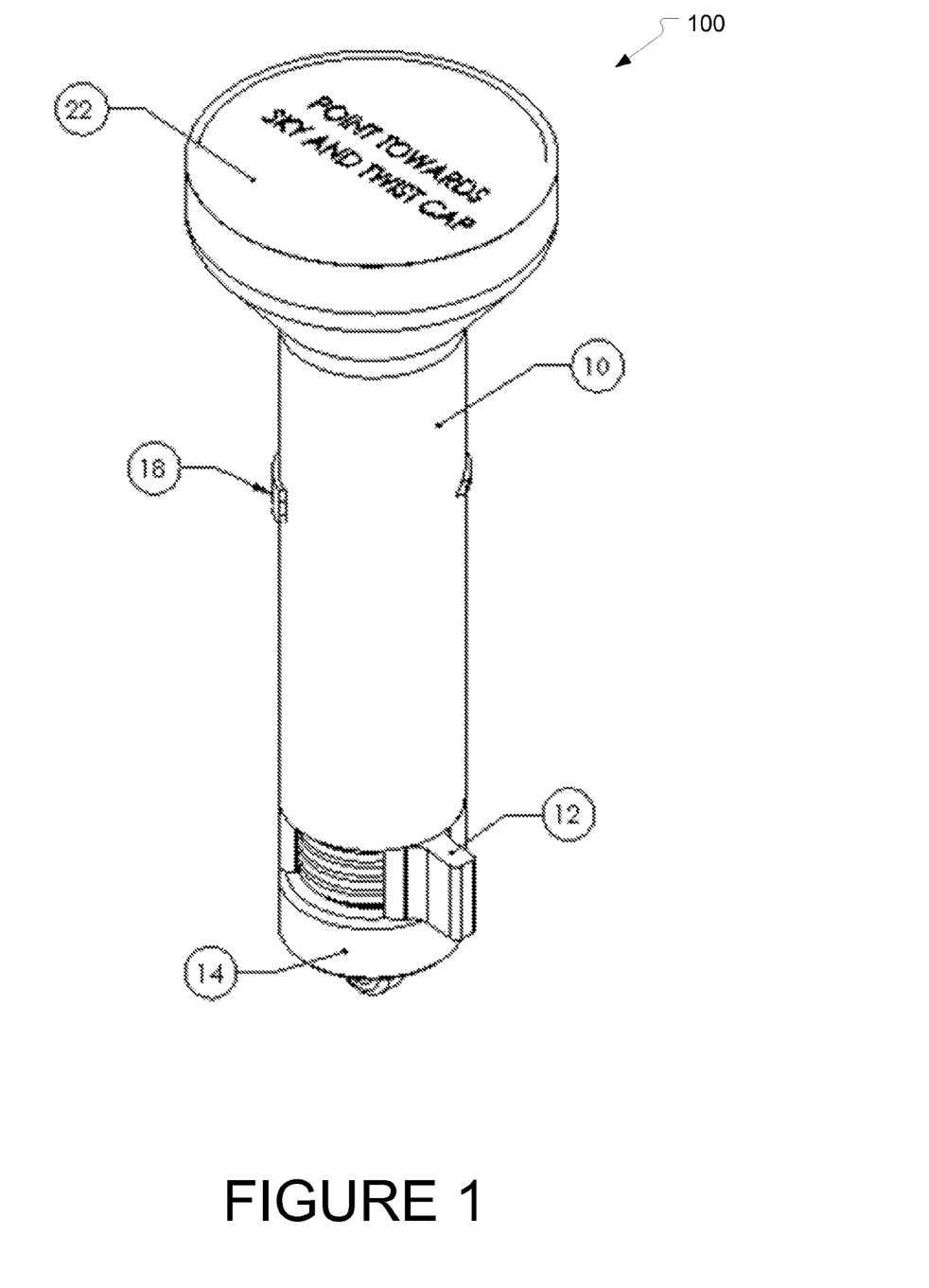
FIG. 1 is an isometric view of the location device in a stowed state in accordance with one or more embodiments of the present invention.
Figure 3:
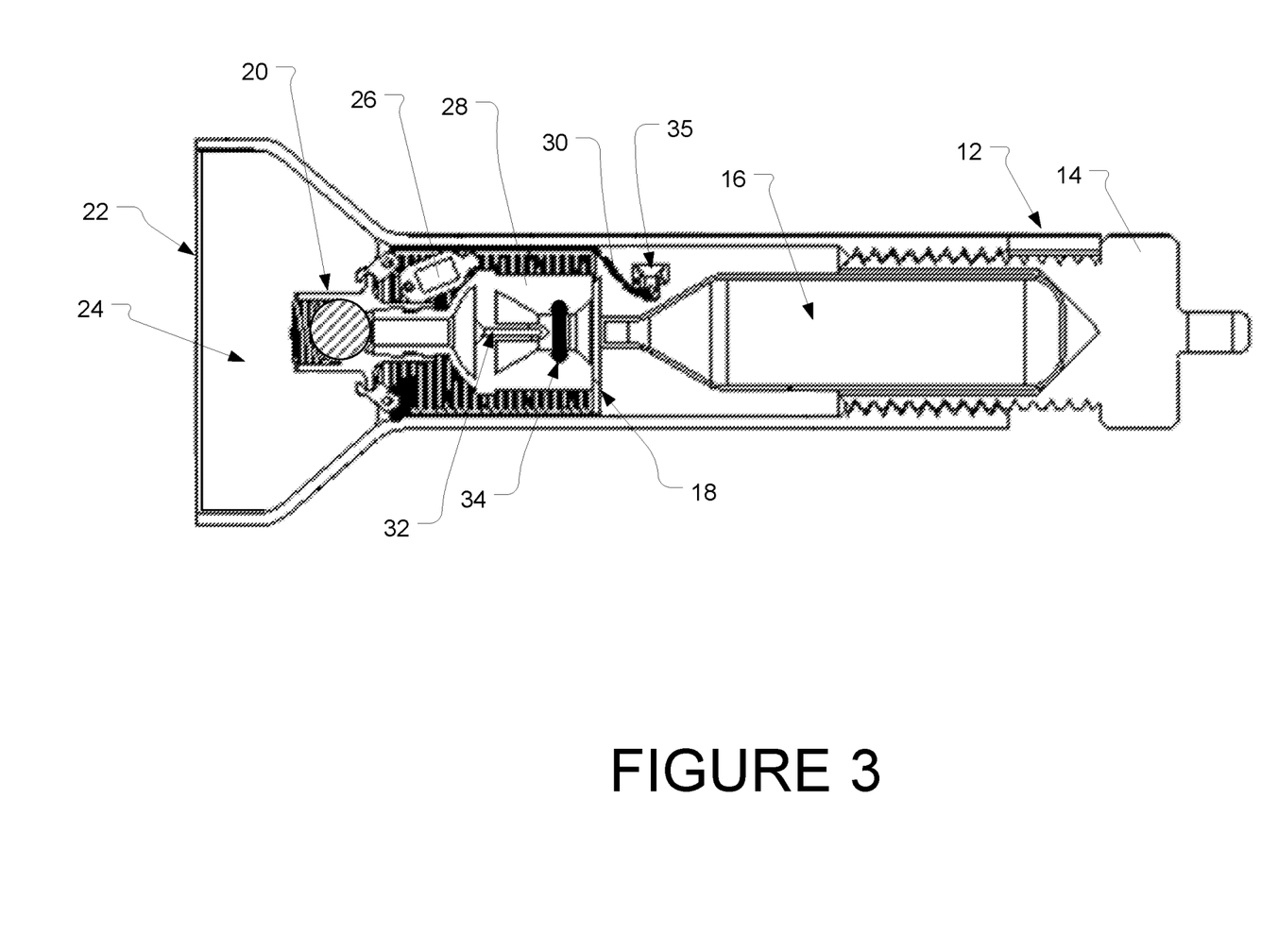
FIG. 3 is a cut away view illustrating the internal components of the fully assembled location device of FIG. 1 in accordance with one or more embodiments of the present invention.
Figure 4:
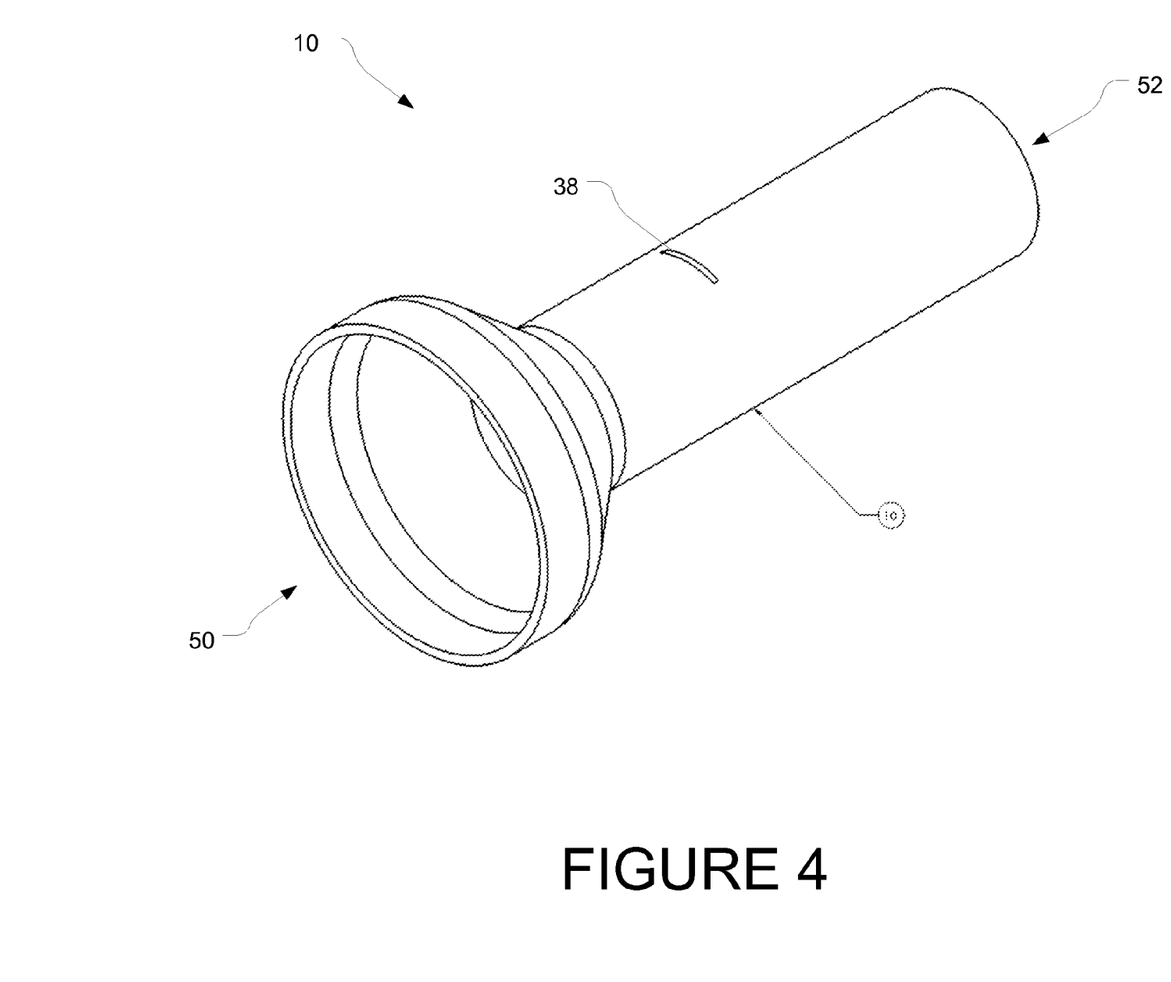
FIG. 4 is an isometric view of the base assembly of the location device in accordance with one or more embodiments of the present invention.

As illustrated, device 100 comprises an elongated tube body or housing 10, with a lumen running from the proximal end 50 to the distal end 52. Housing 10 is preferably configured like a funnel at its proximal end 50 and a threaded inside perimeter at its distal end, as illustrated in FIG. 3. Housing 10 further comprises at least one orifice 38 for Cartridge safety strip 18. Orifice 38 preferably includes a second orifice on the opposite side of tube body 10 for securing cartridge safety strip 18, as illustrated in FIG. 1, such that when safety strip 18 is inserted into orifice 38, it is secured into the second orifice. Thus, in one or more embodiments, foot 64 of safety strip 18 has a length that is equivalent to the outside diameter of tube 10. Tube body 10 is preferably metal but could be made of any suitable material, e.g. plastic, composite, etc.

Figure 5:
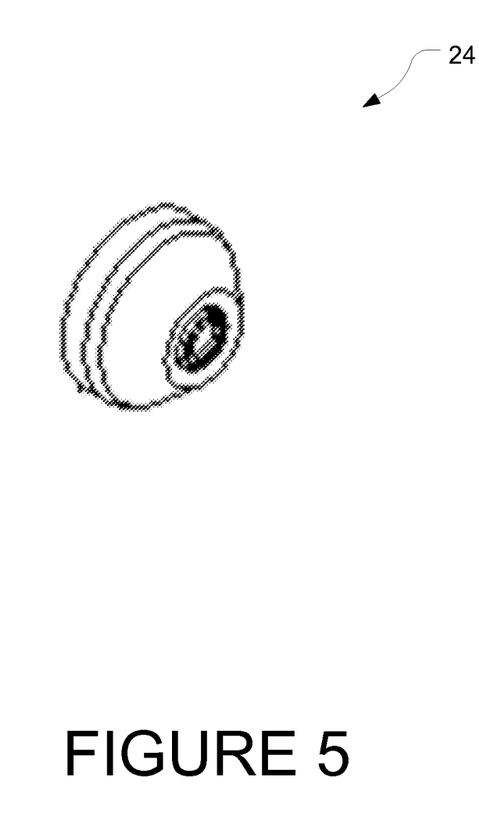
FIG. 5 is an isometric view of the balloon of the location device in an assembled state in accordance with one or more embodiments of the present invention.
Figure 6:
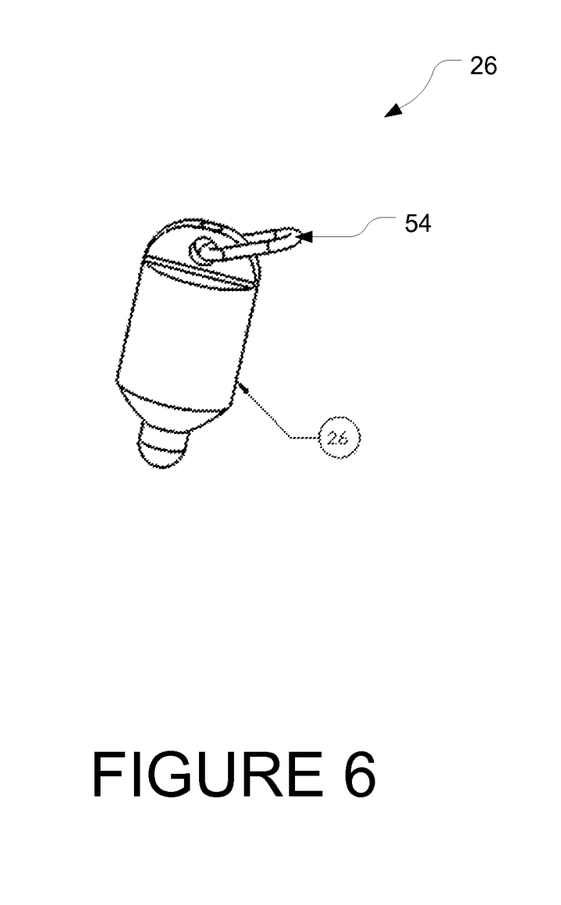
FIG. 6 is an isometric view of the LED Strobe fob of the location device in accordance with one or more embodiments of the present invention.
Figure 7:
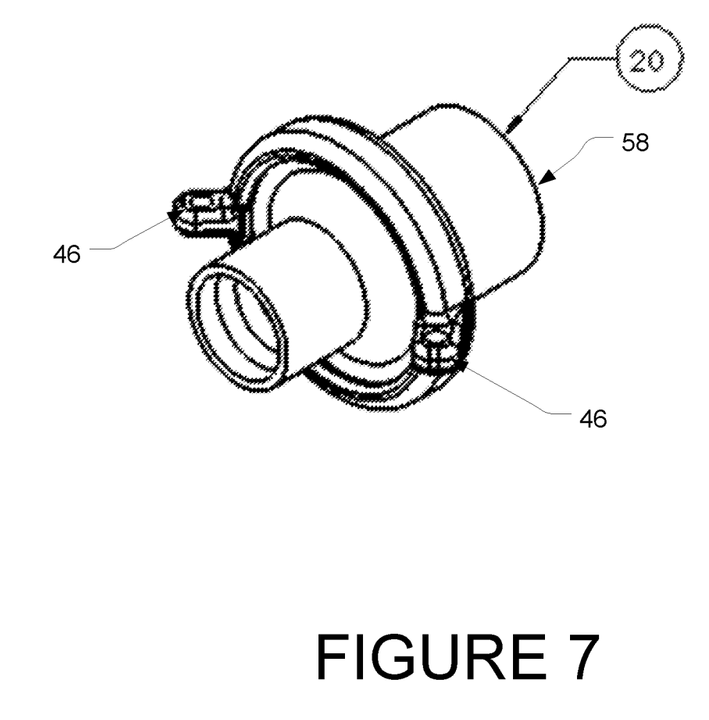
FIG. 7 is an isometric view of the Filler ball valve of the location device in accordance with one or more embodiments of the present invention.
Figure 8:
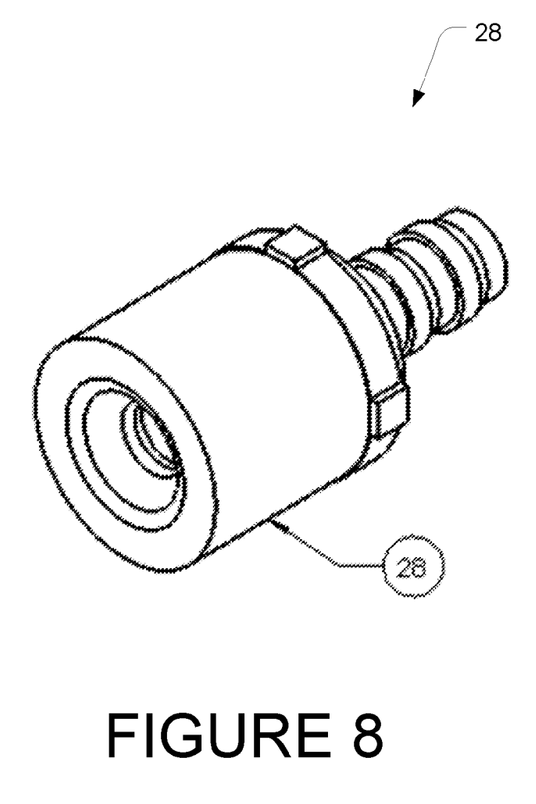
FIG. 8 is an isometric view of the charge valve of the location device in accordance with one or more embodiments of the present invention.
Figure 9:
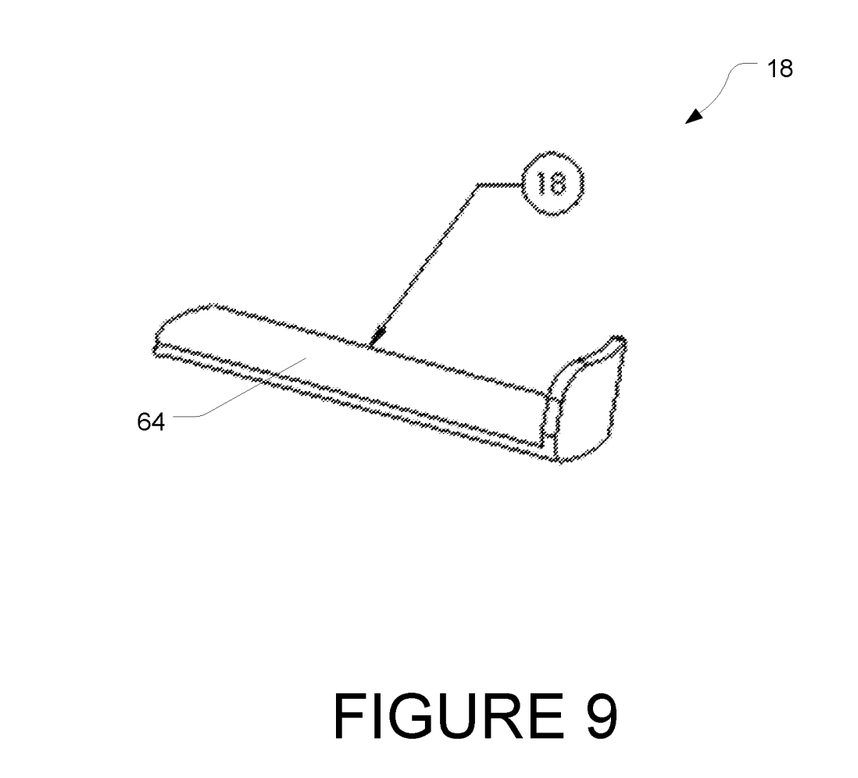
FIG. 9 is an isometric view of the Cartridge safety strip of the location device in accordance with one or more embodiments of the present invention.
Figure 10:
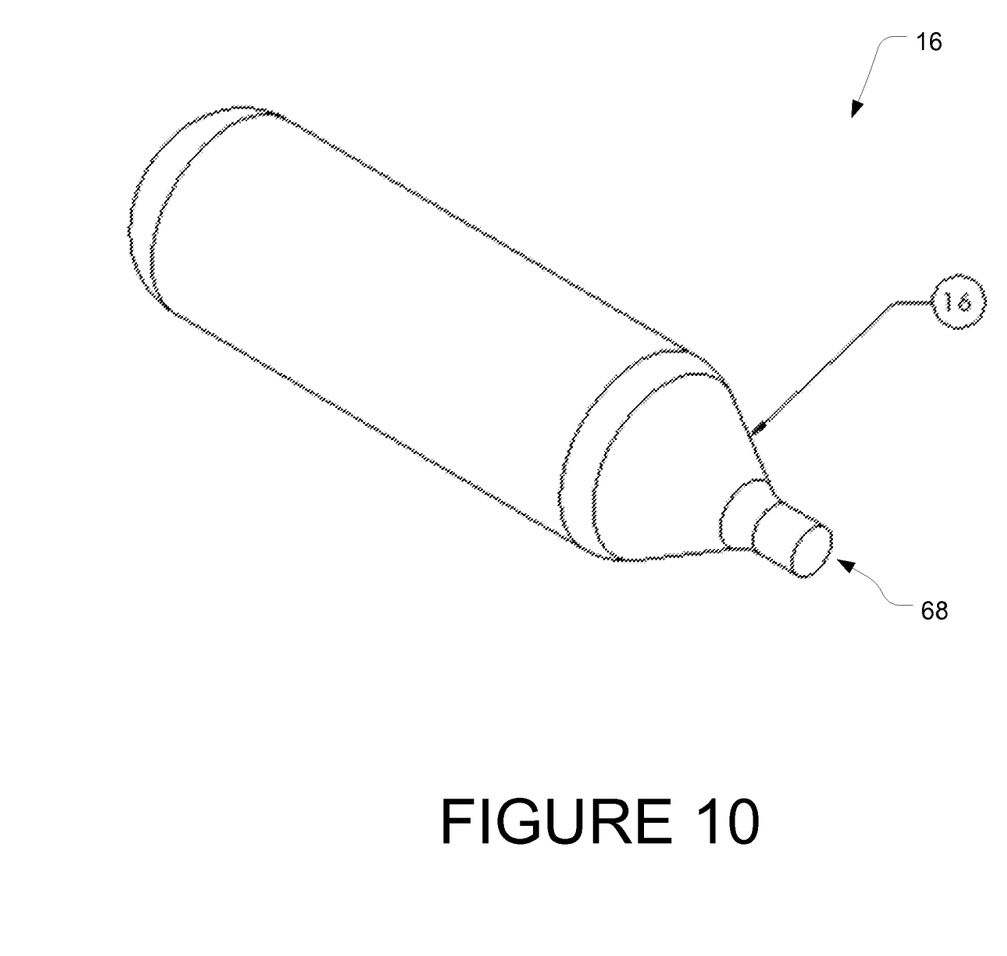
FIG. 10 is an isometric view of the Helium pressure cartridge of the location device in accordance with one or more embodiments of the present invention.
Figure 11:
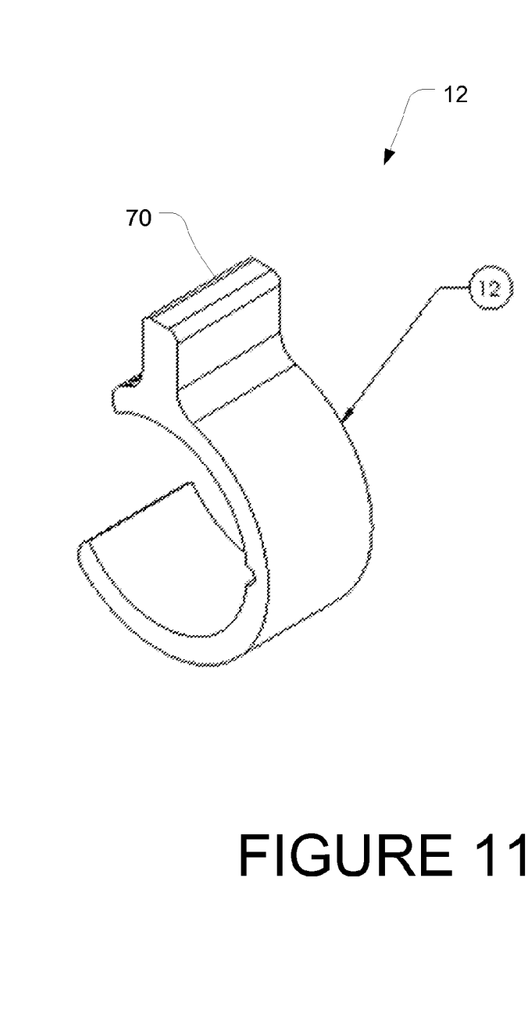
FIG. 11 is an isometric view of the deployment safety clip of the location device in accordance with one or more embodiments of the present invention.
Figure 12:
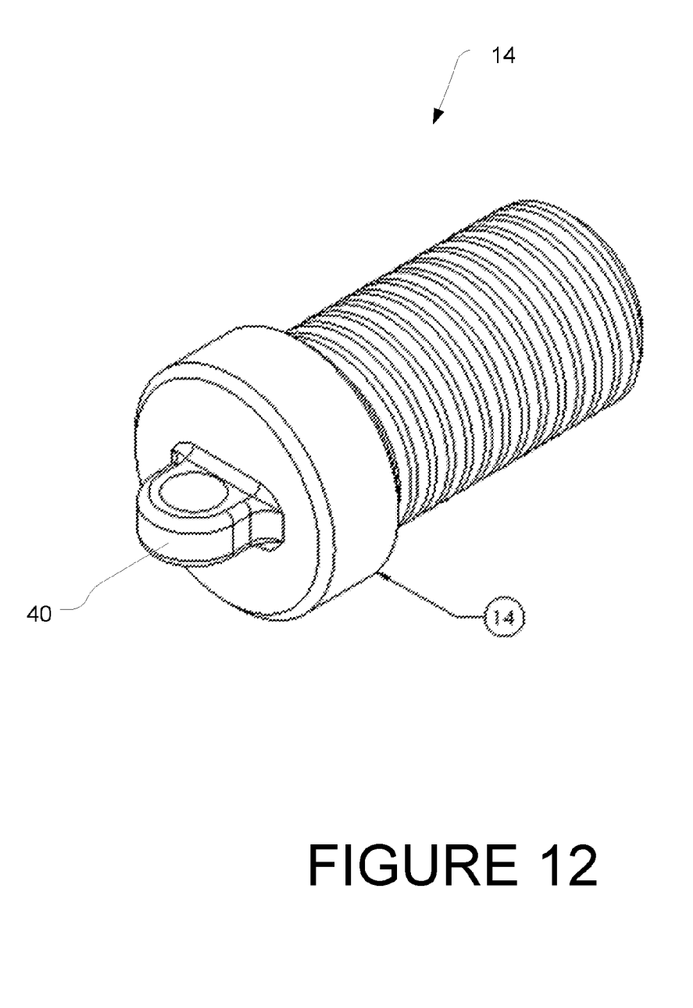
FIG. 12 is an isometric view of the deployment cap of the location device in accordance with one or more embodiments of the present invention.

In one or more embodiments, device 100 further comprises rescue balloon 24, which is configured to fit inside the funnel at the proximal end 50 of housing 10, in its stowed state (see FIG. 5). Rescue balloon 24 is preferably made of Mylar; however, other materials may be used, e.g. plastic, rubber, cloth or any other suitable balloon material.

As illustrated, the Mylar rescue balloon 24 is packaged into the flared end 50 of the tube body 10 and enclosed by a Foil end cap 22, the foil end cap 22 is affixed to the end of the flared (funnel) end 50 of the Tube body 10. Foil end cap 22 is preferably Frangible to allow for deployment of Mylar rescue balloon 24.

Figure 2:
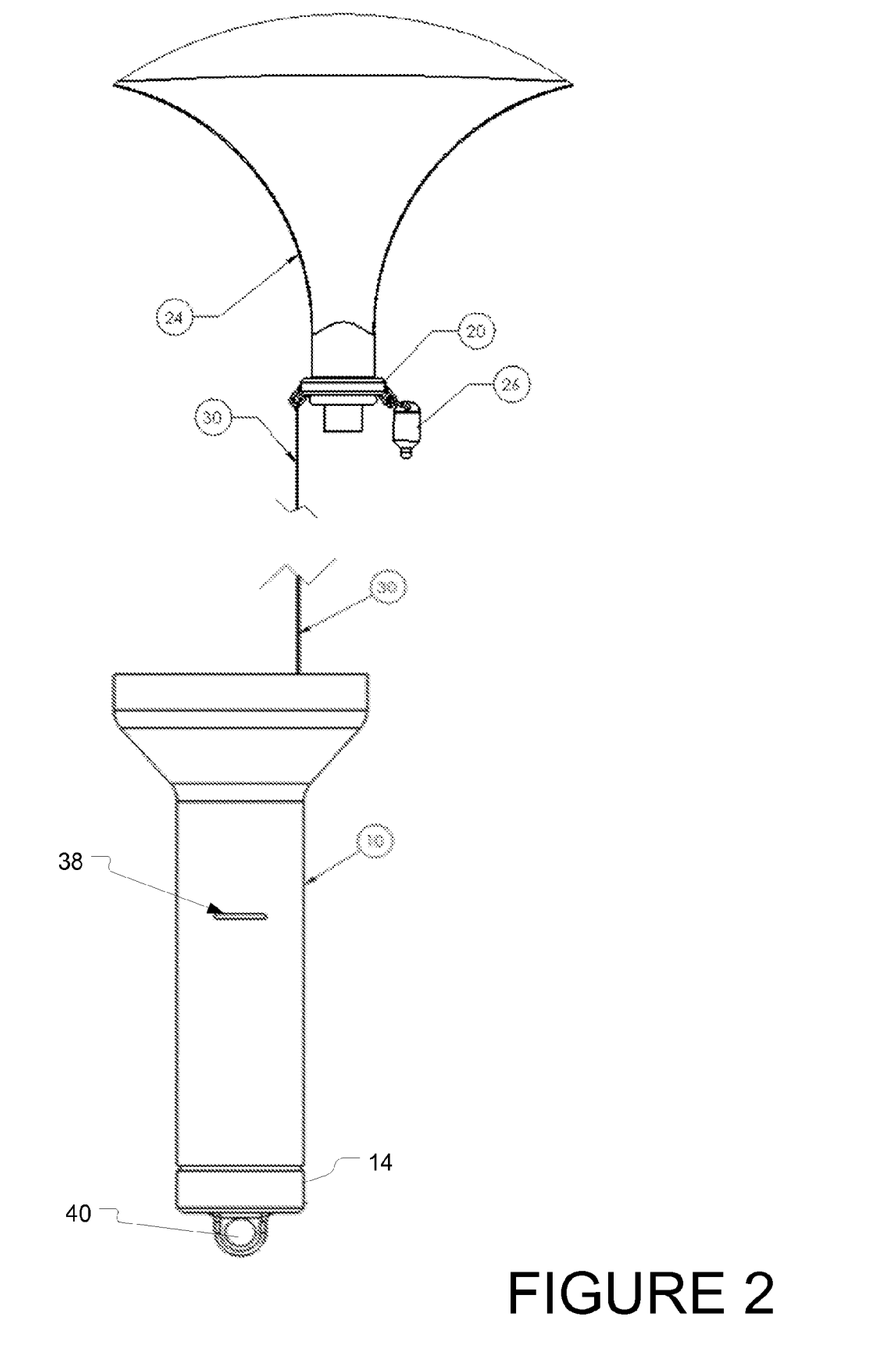
FIG. 2 is an illustration of the location device in a deployed state in accordance with one or more embodiments of the present invention.

In one or more embodiments, device 100 further comprises a filler ball valve 20, coupled to rescue balloon 24 with its proximal end 58 attached to the rescue balloon, 24. Filler ball valve 20 is configured to allow for inflation of rescue balloon 24. An LED strobe fob 26 may be attached to the rescue balloon via the filler ball valve 20, as illustrated in FIG. 2. As illustrated, a metal hook 54 on LED fob 26 is configured to couple with a first one of clip 46 on filler ball valve 20.

In one or more embodiments, device 100 further comprises charger valve 28 coupled to the distal end of filler ball valve 20. The charger valve 28 is installed and mounted in the lumen of tube body 10 between the filler ball valve 20 and the cartridge safety strip 18, which is installed in orifice 38. Cartridge safety strip 18 separates helium pressure cartridge 16 from the charger valve to prevent inadvertent deployment of rescue balloon 24.

In one or more embodiments, a balloon lanyard with spool 30 is mounted in the lumen of tube 10 and preferably around charger valve 28. Balloon lanyard 30 may be coupled to rescue balloon 24 through a second one of clip 46, i.e. lanyard attach point, on filler ball valve 20 and to the inside wall, e.g. hard point 35, of the lumen in tube body 10. Balloon lanyard 30 is preferably of suitable length to allow for full deployment of rescue balloon 24 away from the body while secured to tube body 10. Balloon lanyard 30 can be made of metal, fabric, nylon cord or any other durable lanyard material.

In one or more embodiments, device 100 further comprises helium pressure cartridge or tank 16 inside the lumen of tube body 10. Helium pressure cartridge 16 is mounted such that its proximal end 68, i.e. top of the cartridge, abuts cartridge safety strip 18 and its distal end is towards distal end 52 of tube body 10.

In one or more embodiments, a deployment cap 14 is screwed into the Tube body 10 to secure helium pressure cartridge 16. As illustrated, a substantial portion of helium pressure tank 16 fits inside cap 14 such that the distal end of helium pressure tank 16 abuts the inside wall of cap 14 in such a way that application of pressure from the distal to proximal direction results in movement of the helium pressure tank towards the charger valve 28. A safety clip 12 may be installed between tube body 10 and threaded cap 14 to prevent inadvertent plunging of helium pressure cartridge 16 into charger valve 28. It should be apparent to those of skill art that other deployment devices/mechanisms may be used. For instance, cap 14 may be a plunger type device such that application of inward pressure would result in movement of helium pressure cartridge 16 into charger valve 28. In a preferred embodiment, deployment cap 14 and deployment safety clip 12 are threaded. Deployment cap 14 is threaded substantially on its outside perimeter and configured to thread directly into the distal end of tube body end.

In one or more embodiments, deployment cap 14 may further include a clip 40 for securing device 100 to a person or thing needing rescue. For instance, a sturdy rope may be used to secure device 100 to a life vest.

In one or more embodiments, deployment safety clip 12 is configured to fit around the threads of deployment cap 14. Deployment safety clip 12 may be threaded on the inside to match the threads of deployment cap 14.

In the illustrated embodiment, to deploy the rescue balloon, the user holds device 100 by the Tube body 10, removes and discards the cartridge safety strip 18 from orifice 38, located approximately in the middle of tube body 10, the user will then remove and discard the safety clip 12, e.g. by pulling on the tab 70 and breaking the deployment safety clip 12 from the tube body 10 and the deployment cap 14.

The user then points the top of the tube body 10, i.e. proximal end 50, towards the sky grips and twists threaded cap 14 in a direction to cause compression into tube body 10, e.g. counter clockwise direction into the tube body 10.

As the threaded cap 14 screws into the tube body 10 the Helium pressure cartridge 16 will be forced into the charger valve 28 past the O-ring seal 34 in the charger valve 28 and onto the charging needle 32 that is part of the charger valve 28. The charger valve 28 will pierce the Helium pressure cartridge 16 and helium will flow through the filler ball valve 20, and activate the Mylar rescue balloon 24.

As the Mylar rescue balloon 24 starts to inflate it will push out and destroy the Foil end cap 22 that is attached to the end of tube body 10. As the Mylar rescue balloon 24 exits the tube body 10 it will unfold and the shape of the inflated Mylar rescue balloon 24 will cause disengagement of the filler ball valve 20 from the charger valve 28.

The Mylar rescue balloon 24 will start to unravel the internal balloon lanyard 30 from its internal storage location, as the Mylar rescue balloon 24 clears the tube body 10 it will deploy the LED strobe fob 26. In a preferred embodiment, LED strobe fob 26 will start to strobe until its internal battery is completely discharged.

The rescue balloon 24 deploys to its full, i.e. operational, height and diameter upon activation, e.g. preferably between 250 to 500 feet. Other heights may be acceptable so long as the balloon clears the object being rescued and provides sufficient height to be seen by rescuers, e.g. from airplanes or ships. Of course, the height of the balloon depends on the height of the lanyard 30 and the size of the balloon. The inflated diameter of the balloon is preferably between about 2 feet and 12 feet. The location device 100 is preferably attached to a life preserver, backpack or any other secure object on the person or thing being rescued.

FIG. 2 is an illustration of the location device in a deployed state in accordance with one or more embodiments of the present invention. As illustrated, cap 14 may be fully or partially threaded into tube body 10 when the rescue balloon is deployed. Deployment is facilitated by removal of deployment safety clip 12 and cartridge safety strip 18.

While the invention herein disclosed has been described by means of specific embodiments and applications thereof, numerous modifications and variations could be made thereto by those skilled in the art without departing from the scope of the invention set forth in the claims.

What is claimed is:

1. An emergency location device comprising:
   a elongated tube body with a lumen, wherein said tube body is configured as a funnel at its proximal end;
   a rescue balloon securely stowed inside said funnel;
   a frangible cap at said proximal end securing said rescue balloon inside said funnel;
   a filler ball valve coupled to said rescue balloon;
   a charger valve with a piercing needle and an O-ring seal coupled to said filler ball valve;
   a helium pressure cartridge coupled to said charger valve so that said piercing needle is configured to puncture the helium pressure cartridge thereby causing transfer of helium through to the rescue balloon; and
   a deployment cap coupled to a distal end of said tube body thereby securing said helium pressure tank inside said lumen of said tube body, wherein said deployment cap is configured to cause deployment of the rescue balloon by forcing the helium pressure cartridge to be pierced by said piercing needle.

2. The emergency location device of claim 1, further comprising a lanyard securing said rescue balloon to said tube body.

3. The emergency location device of claim 2, wherein said lanyard is made of Nylon.

4. The emergency location device of claim 1, further comprising an LED strobe fob coupled to said rescue balloon.

5. The emergency location device of claim 1, further comprising a removable safety strip between said charger valve and said helium pressure cartridge.

6. The emergency location device of claim 1, further comprising a removable deployment clip between said tube body and said deployment cap, wherein said deployment clip is configured to prevent movement of the helium pressure cartridge into the piercing needle.

7. The emergency location device of claim 1, wherein said rescue balloon is made of Mylar.

8. An emergency location device comprising:
   a elongated tube body with a lumen, wherein said tube body is configured as a funnel at its proximal end;
   a rescue balloon securely stowed inside said funnel, wherein said rescue balloon is secured inside said funnel with a frangible cap at said proximal end and secured to said tube body through a lanyard spool;
   a filler ball valve coupled to said rescue balloon to allow inflation of said rescue balloon;
   a charger valve with a piercing needle and an 0-ring seal coupled to said filler ball valve;
   a helium pressure cartridge coupled to said charger valve so that said piercing needle is configured to puncture the helium pressure cartridge thereby causing transfer of helium through to the rescue balloon; and
   a deployment cap coupled to a distal end of said tube body thereby securing said helium pressure tank inside said lumen of said tube body, wherein said deployment cap is configured to cause deployment of the rescue balloon by forcing the helium pressure cartridge to be pierced by said piercing needle.

9. The emergency location device of claim 8, wherein said lanyard is made of Nylon.

10. The emergency location device of claim 8, further comprising an LED strobe fob coupled to said rescue balloon.

11. The emergency location device of claim 8, further comprising a removable safety strip between said charger valve and said helium pressure cartridge.

12. The emergency location device of claim 8, further comprising a removable deployment clip between said tube body and said deployment cap, wherein said deployment clip is configured to prevent movement of the helium pressure cartridge into the piercing needle.

13. The emergency location device of claim 8, wherein said rescue balloon is made of Mylar.

14. An emergency location device comprising:
   a elongated tube body with a lumen, wherein said tube body is configured as a funnel at its proximal end;
   a rescue balloon securely stowed inside said funnel, wherein said rescue balloon is secured inside said funnel with a frangible cap at said proximal end and secured to said tube body through a lanyard spool;
   a filler ball valve coupled to said rescue balloon to allow inflation of said rescue balloon;
   a charger valve with a piercing needle and an O-ring seal coupled to said filler ball valve;
   a helium pressure cartridge coupled to said charger valve so that said piercing needle is configured to puncture the helium pressure cartridge thereby causing transfer of helium through to the rescue balloon;
   a removable safety strip between said charger valve and said helium pressure cartridge;
   a deployment cap coupled to a distal end of said tube body thereby securing said helium pressure tank inside said lumen of said tube body, wherein said deployment cap is configured to cause deployment of the rescue balloon by forcing the helium pressure cartridge to be pierced by said piercing needle; and
   a removable deployment clip between said tube body and said deployment cap, wherein said deployment clip is configured to prevent movement of the helium pressure cartridge into the piercing needle.

15. The emergency location device of claim 14, wherein said lanyard is made of Nylon.

16. The emergency location device of claim 14, further comprising an LED strobe fob coupled to said rescue balloon.

17. The emergency location device of claim 14, wherein said rescue balloon is made of Mylar.

\* \* \* \* \*